(12) United States Patent
Uehara (10) Patent No.: US 7,992,263 B2
(45) Date of Patent: Aug. 9, 2011

(54) BELT CONNECTOR

(75) Inventor: Ryoichiro Uehara, Kurobe (JP)

(73) Assignee: YKK Corporation, Tokyo (JP)

( * ) Notice: Subject to any disclaimer, the term of this patent is extended or adjusted under 35 U.S.C. 154(b) by 415 days.

(21) Appl. No.: 11/891,978

(22) Filed: Aug. 14, 2007

(65) Prior Publication Data

US 2008/0040900 A1 Feb. 21, 2008

(30) Foreign Application Priority Data

Aug. 17, 2006 (JP) ................................. 2006-222631

(51) Int. Cl.
*A44B 13/00* (2006.01)
(52) U.S. Cl. ..... 24/265 H; 24/265 R; 24/464; 24/598.1; 24/601.2
(58) Field of Classification Search .............. 24/265 R, 24/265 H, 265 BC, 265 EC, 601.5, 601.8, 24/165, DIG. 51, DIG. 60, 604, 629, 581.1, 24/581.11; 403/397

See application file for complete search history.

(56) References Cited

U.S. PATENT DOCUMENTS

| | | | | | |
|---|---|---|---|---|---|
| 838,995 | A | * | 12/1906 | Hopkins | 24/581.11 |
| 1,375,756 | A | * | 4/1921 | Holmes | 24/581.1 |
| 4,646,503 | A | * | 3/1987 | Brullmann et al. | 52/646 |
| 4,680,837 | A | * | 7/1987 | Rubinstein | 24/601.2 |
| 4,694,544 | A | * | 9/1987 | Chapman | 24/625 |
| 4,797,983 | A | * | 1/1989 | Barnett et al. | 24/289 |
| 4,868,954 | A | * | 9/1989 | Kasai | 24/601.2 |
| 5,075,938 | A | * | 12/1991 | Hutchinson | 24/464 |
| 5,113,553 | A | * | 5/1992 | Hutchinson | 24/464 |
| 5,127,137 | A | * | 7/1992 | Krauss | 24/265 R |
| 5,146,657 | A | * | 9/1992 | Frano | 24/265 H |
| 5,199,139 | A | * | 4/1993 | Hutchinson | 24/108 |

(Continued)

FOREIGN PATENT DOCUMENTS

EP 0698742 2/1996

(Continued)

OTHER PUBLICATIONS

Office Action dated Oct. 17, 2008 cited in corresponding German Patent Application No. 10 2007 036 352.6-12.

(Continued)

*Primary Examiner* — Robert J Sandy
*Assistant Examiner* — Rowland D Do
(74) *Attorney, Agent, or Firm* — Alston & Bird LLP (57) ABSTRACT

To connect a belt connecting member (4) of a first member (1) with a snap hook (5) of a second member (2), a neck portion (21) having a circular cross section is provided so as to project from a connecting portion of the snap hook (5), a bulging portion (22) is provided on a tip end of the neck portion (21) so as to radially bulge to define an engaging portion (23), a fitting hole (13) is provided on a connecting portion of the belt connecting member (4) with an engaged portion (15) that is engageable with the bulging portion (22), the engaged portion (15) and the engaging portion (23) are formed in an oval shape having a long axis (L, L') in a flush plane of the belt connecting member (4) and the snap hook (5) and a short axis (S, S') in orthogonal planes of the belt connecting member (4) and the snap hook (5), and the engaging force can be largest when the snap hook (5) is in its most general state in use where the belt connecting member (4) and the snap hook (5) are orthogonal.

6 Claims, 10 Drawing Sheets

U.S. PATENT DOCUMENTS

| | | | | |
|---|---|---|---|---|
| 5,232,322 A * | 8/1993 | Regensburger | ................ | 411/33 |
| 5,274,887 A * | 1/1994 | Fudaki | ................ | 24/265 H |
| 5,475,901 A * | 12/1995 | Anscher | ................ | 24/265 H |
| 5,502,878 A | 4/1996 | Anscher | | |
| 5,566,428 A * | 10/1996 | Takahashi | ................ | 24/265 H |
| 5,634,246 A * | 6/1997 | Jermyn, Jr. | ................ | 24/601.5 |
| 5,862,917 A * | 1/1999 | Noble et al. | ................ | 206/600 |
| 6,186,188 B1 * | 2/2001 | Horter et al. | ................ | 139/85 |
| 6,470,535 B1 * | 10/2002 | Mayne et al. | ................ | 24/3.12 |
| 6,539,593 B2 * | 4/2003 | Morris | ................ | 24/265 R |
| 6,557,329 B2 * | 5/2003 | Schmidt | ................ | 54/85 |
| 6,584,655 B1 * | 7/2003 | Cardwell, III et al. | ................ | 24/643 |
| 6,739,022 B1 * | 5/2004 | Chen | ................ | 24/598.1 |
| 6,796,003 B1 * | 9/2004 | Marvel | ................ | 24/135 N |
| 7,231,694 B2 * | 6/2007 | Ignaczak et al. | ................ | 24/279 |
| 2004/0036303 A1 * | 2/2004 | Yu | ................ | 294/82.19 |
| 2005/0028332 A1 * | 2/2005 | Saltenberger et al. | ................ | 24/704.1 |
| 2007/0261210 A1 * | 11/2007 | Chen | ................ | 24/265 H |
| 2008/0141499 A1 * | 6/2008 | Chung | ................ | 24/265 H |

FOREIGN PATENT DOCUMENTS

| | | |
|---|---|---|
| GB | 2 254 368 A | 10/1992 |
| JP | 2932138 | 5/1999 |

OTHER PUBLICATIONS

Search Report dated May 17, 2010, French Application No. 07 57048.

* cited by examiner

BELT CONNECTOR

BACKGROUND OF THE INVENTION

1. Field of the Invention

The present invention relates to a snap hook made of synthetic resin which can be easily hooked to a stopper attached via a belt to bags such as a shoulder bag and a backpack. The invention also relates to a connector that rotatably attaches a belt attaching member disposed on one end of an inserted body of an insert-type buckle or a connector that rotatably connects belt attaching members used for connecting right and left belts.

The invention further relates to a connector including two members rotatably connected to each other. The connector includes: a synthetic-resin snap hook having a fist member to which a belt of a shoulder bag, a backpack and the like is inserted and a second member to which a stopper attached to a bag, other bag bodies and the like is easily hooked; an insert-type buckle having an insert body with an end to which a belt attaching member is rotatably attached; and a rotatably-connected pair of belt attaching members for connecting right and left belts.

2. Description of Related Art

A snap hook of easy handling has been known which includes: a ring frame body or a supporting ring on which a belt of a shoulder bag and the like is attached; and a hook body rotatable relative to the frame body or the supporting ring, the hook body including a hook and an elastic piece provided next to each other.

Figure 13:
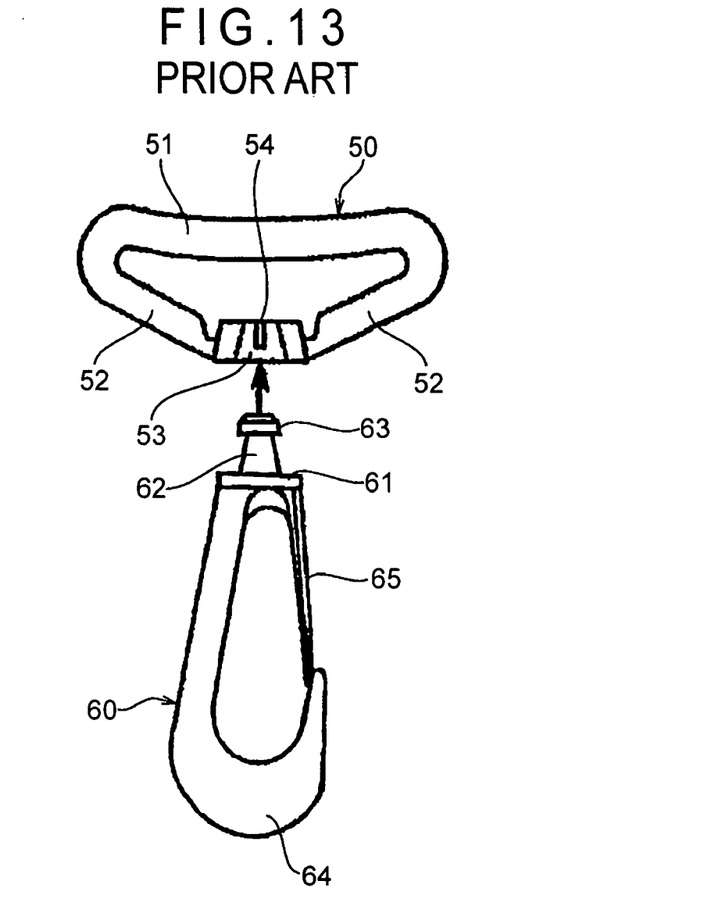
FIG. 13 is an exploded front view showing a prior art snap hook.

As shown in FIG. 13 for example, a snap hook includes a holding member 50 and a hook main body 60 has been known (Japanese Patent No. 2932138), where the holding member 50 includes a base bar 51 and a pair of right and left transformation bars 52 connected to each other, forming an isosceles triangle of the holding member 50. The holding member 50 includes a fitting hole 53 in the middle of the pair of transformation bars 52, the fitting hole 53 tapered so as to have a larger diameter on its outer side. The fitting hole has a notch 54 (a slit) formed in a smaller diameter portion of the fitting hole 53, enabling a deformation. The hook main body 60 includes a base plate 61, a shaft 62 provided on a surface of the base plate 61, an enlarging portion 63 in a bulging shape provided on a tip end of the shaft 62 and a hook portion 64 and a closing tongue-like piece 65 provided next to each other on another surface of the base plate 61. The closing tongue-like piece 65 is elastically deformable. The enlarging portion 63 on the tip end of the shaft 62 projecting from the base plate 61 of the hook main body 60 is rotatably inserted in the fitting hole 53 of the holding member 50.

Figure 14:
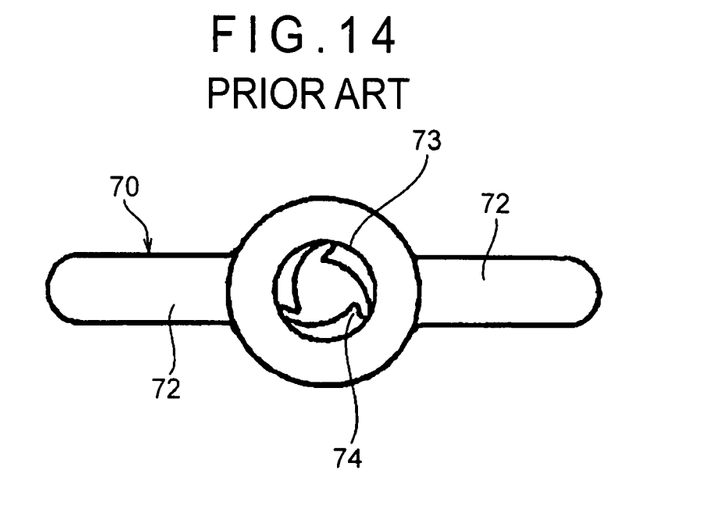
FIG. 14 is a plan view showing another prior art snap hook.

An improvement of the above snap hook is shown in FIG. 14, where a fitting hole 73 is formed on an expanded portion in the middle of right and left transformation bars 72, the fitting hole 73 having three pointed ends are provided on the inner circumference thereof and the enlarging portion 63 provided on the tip end of the circular-cross-section shaft 62 projecting from the base plate 61 of the hook main body (the same shape as the above snap hook) is inserted into the fitting hole 73 in a rotatable manner (see the specification of U.S. Pat. No. 5,502,878).

In the above-stated snap hook shown in FIGS. 13 and 14, the enlarging portion 63 of the hook main body 60 and the fitting holes 53, 73 formed in the middle of the right and left transformation bars 52, 72 of holding members 50, 70 each have a circular shape. Regardless of relative positions of the hook main body 60 and the holding members 50, 70, the enlarging portions 63 of the hook main bodies 60 is easily disengaged from the fitting holes 53, 73 of the holding members 50, 70, so that these snap hooks have a similar strength. Accordingly, when being at an often used rotational position, namely when the holding members 50, 70 are orthogonal to the hook main body 60 of a snap hook used for a shoulder bag and the like, the enlarging portion 63 is easily disengaged from the fitting hole 53, 73, so that the snap hook is not usable.

SUMMARY OF THE INVENTION

The present invention has been achieved in consideration of the above-described problems. In a connector including: a main body of a snap hook and a belt connecting member; a buckle main body and a belt connecting member of an insert-type buckle; or two belt connecting members, an object of the invention is to provide a connector with a reduced risk of disengagement by providing bulging portions and fitting holes of a first member and a second member having an oval form including an ellipse shape to ensure an appropriate engaging strength between the first and second members regardless of relative positions of the first and second members.

Another object of the invention is to provide a connector in which an engaging portion provided on a bulging portion can be securely engaged with an engaged portion formed in a fitting hole by changing a contacting area in accordance with rotational positions of a first member and a second member and in which the first member and the second member can smoothly rotate by providing a neck portion with a circular cross section on which the bulging portion is disposed.

Still another object of the invention is to provide a connector in which an engaging portion on a bulging portion is formed larger than an engaged portion of a fitting hole such that the bulging portion can be reliably press-fitted into the fitting hole.

Further object of the invention is to provide a connector in which a fitting hole has a large-diameter circular shape on an entrance side of a press-fitting of a bulging portion, the fitting hole having an oval form including an ellipse shape of a small diameter on an exit side.

Still further object of the invention is to provide a connector in which: a first member is formed by a belt connecting member; a second member is formed by a main body of a snap hook; a bulging portion is provided on the main body of the snap hook; and a fitting hole is formed in a belt connecting bar of the belt connecting member, when the snap hook body and the belt connecting member are connected, a contacting area between an engaging portion and an engaged portion becomes larger when the snap hook body is located on a plane orthogonal to a plane on which the belt connecting member is located than the contacting area when the snap hook body and the belt connecting member are located on the same plane, so that the engaging portion and the engaged portion can be reliably engaged to exhibit maximum strength.

To achieve the above-stated objects, a connector according to an aspect of the invention includes: a first member 1; and a second member 2. One of the first member 1 and the second member 2 includes: a neck portion 21 projecting from the one of the first member 1 and the second member 2; and an oval bulging portion 22 formed on a tip end of the neck portion 21. The other of the first member 1 and the second member 2 includes: a fitting hole 13 into which the bulging portion 22 is press-fitted in a rotatable manner, the fitting hole defining an entrance side and an exit side of the bulging portion, the exit side having an oval shape; an engaging portion 23 formed around the circumference of the bulging portion to be engageable within the fitting hole 13; and an engaged portion 15 formed on a periphery of the fitting hole 13 on the exit side to be engageable with the bulging portion 22.

According to the aspect of the invention, since the bulging portion provided on the tip end of the neck portion and the exit side of the fitting hole into which the bulging portion is press-fitted are adapted to have an oval form including an ellipse shape with a long axis and a short axis, an engaging strength of the bulging portion can be improved and engaging operation can be accurately conducted by aligning the bulging portion and the fitting hole in a predetermined manner.

In the connector according to the aspect of the invention, the neck portion 21 may have a circular shape in cross section, and the engaging portion 23 formed on the bulging portion 22 and the engaged portion 15 formed in the fitting hole 13 may be so formed that a contacting area varies in accordance with a position on which the first member 1 and the second member 2 rotate.

According to the aspect of the invention, the first and second members connected to each other can smoothly and freely rotate; a contacting area between the engaging portion and the engaged portion varies depending on whether the engaging portion and the engaged portion are engaged in the same plane or orthogonal planes such that the highest connecting strength can be obtained when the portions are disposed in orthogonal planes.

In the connector according to the aspect of the invention, a short axis S of the engaged portion 15 of the fitting hole 13 having the oval shape may be shorter than a short axis S' of the engaging portion 23 of the bulging portion 22 having the oval shape, and a long axis L' of the engaging portion 23 of the bulging portion 22 may be longer than a long axis L of the engaged portion 15 of the fitting hole 13.

According to the aspect of the invention, since the engaged portion formed around the circumference of the bulging portion is smaller, it is possible to easily attach the fitting hole to the bulging portion and once the first and second members are connected, the members will not be unintentionally disengaged.

In the connector according to the aspect of the invention, the fitting hole 13 in which the bulging portion 22 is press-fitted and engaged may have a large-diameter circular shape on an entrance side of the bulging portion 22 and an oval shape including an ellipse on an exit side, of which short axis S is smaller than a diameter of the circular shape on the entrance side of the bulging portion 22.

According to the aspect of the invention, the entrance side of the bulging portion of the fitting hole can be formed in a circular shape which can be easily molded and the exit side of the bulging portion can be formed to have the engaged portion of an oval form with a short axis smaller than the diameter of the fitting hole on the entrance side, so that the fitting hole and the bulging potion can be reliably and securely engaged with each other.

In the connector according to the aspect of the invention, the first member 1 may be formed by a belt connecting member 4, the second member 2 may be formed by a main body 19 of a snap hook 5, the bulging portion 22 may be formed on the main body 19 of the snap hook 5, and the fitting hole 13 may be formed on a belt supporting bar 11 of the belt connecting member 4.

In the connector according to the aspect of the invention, when the main body 19 of the snap hook 5 is connected with the belt connecting member 4, a contacting area of the engaging portion 23 and the engaged portion 15 when the main body 19 of the snap hook 5 and the belt connecting member 4 are in orthogonal planes may be larger than that when the main body 19 of the snap hook 5 is on the same plane as the belt connecting member 4.

According to the aspect of the invention, the first member and the second member of the connector are respectively formed by the belt connecting member and the main body of the snap hook; the belt connecting member and the main body of the snap hook can be easily assembled; the assembled snap hook can have a high connecting strength even when the first and second members are used at highest frequency, namely when the belt connecting member and the main body of the snap hook are orthogonal to each other; and even when any external force is applied on the snap hook, the bulging portion will not be disengaged from the fitting hole, thereby providing a snap member of high quality.

DETAILED DESCRIPTION OF PREFERRED EMBODIMENT(S)

A snap hook 5 having a high utility value as a connector according to the invention will be described below with reference to FIGS. 1 to 8. A belt connecting member 4 (a first member 1) and the snap hook 5 (a second member 2) are formed by injection molding using as a synthetic resin a thermoplastic resin such as polyamide, polyester, polypropylene, polybutylene terephthalate and the like so as to provide elasticity on the belt connecting member 4 and the snap hook 5.

Figure 1:
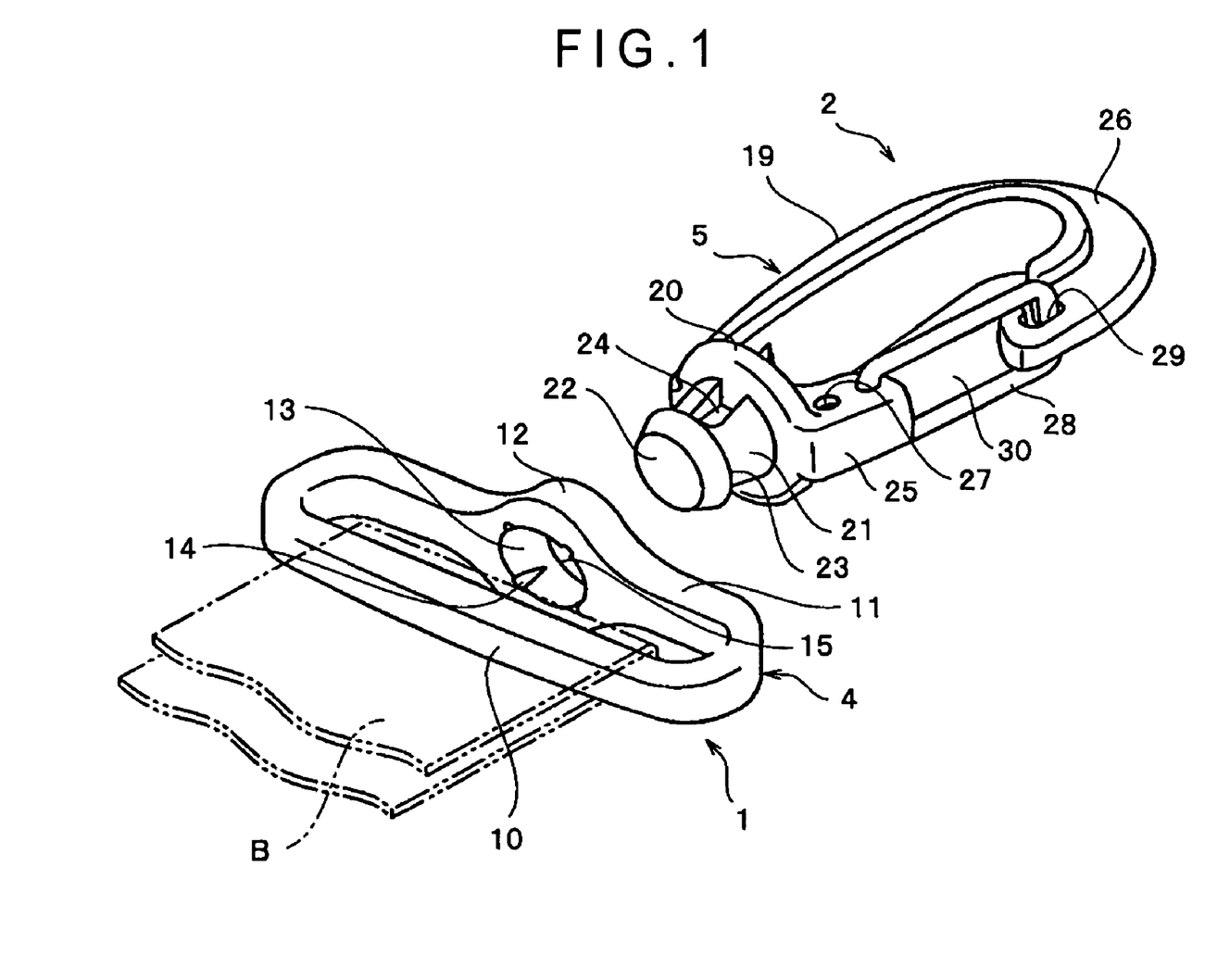
FIG. 1 is an exploded perspective view showing a connector according to a first embodiment of the invention.
Figure 2:
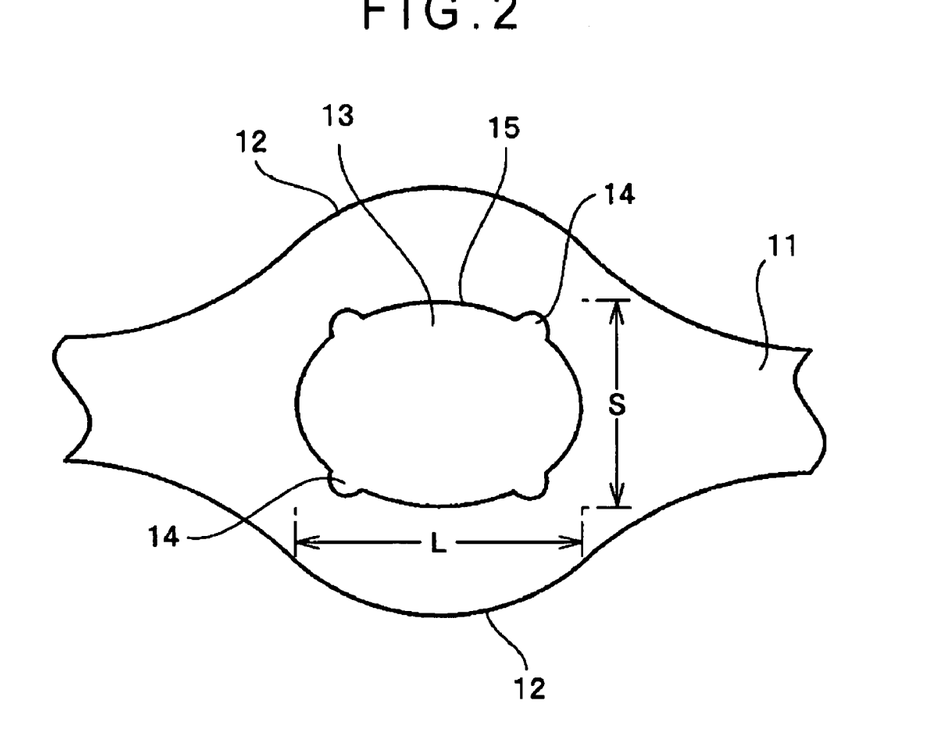
FIG. 2 is a plan view showing a fitting hole (on an exit side) provided in a belt supporting bar of the connector according to the first embodiment.
Figure 4:
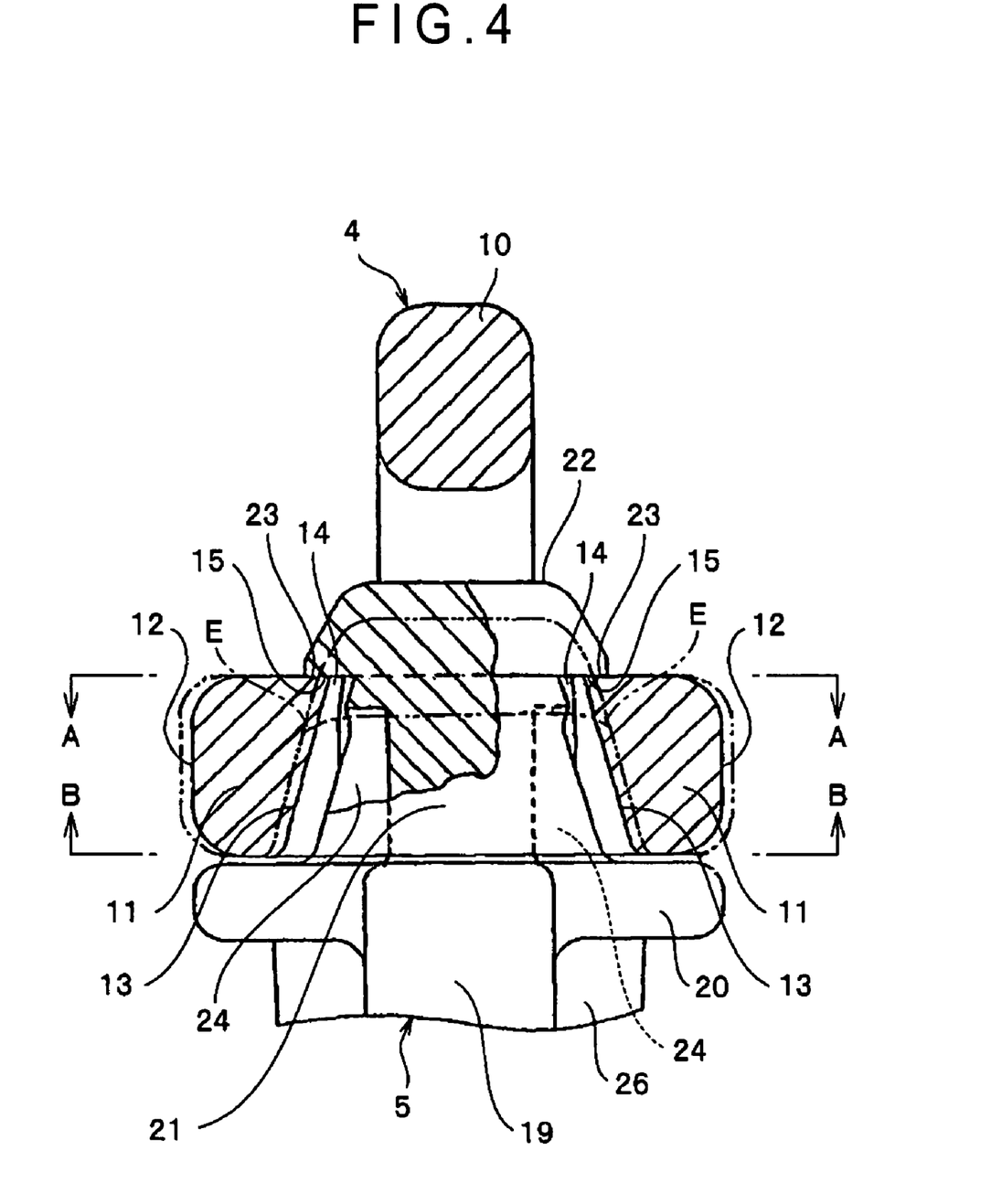
FIG. 4 is a front view showing, with a partial cutout, the connector in an engaged state of the first embodiment, the phantom line showing a press-fitting process of the bulging portion.
Figure 5:
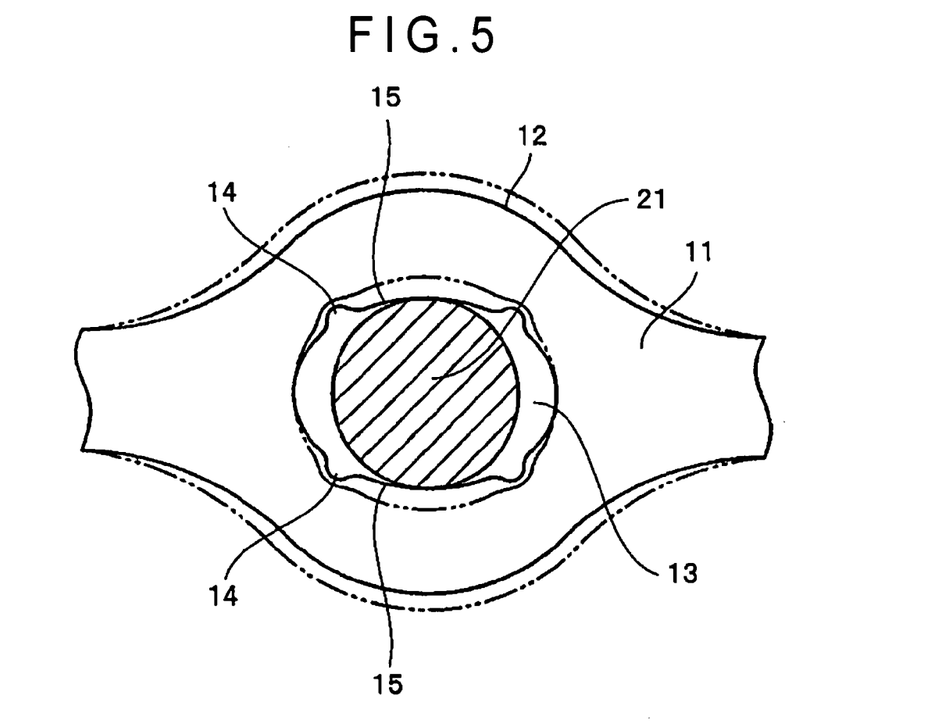
FIG. 5 is a cross section taken along A-A line in FIG. 4 of the connector according to the first embodiment.
Figure 6:
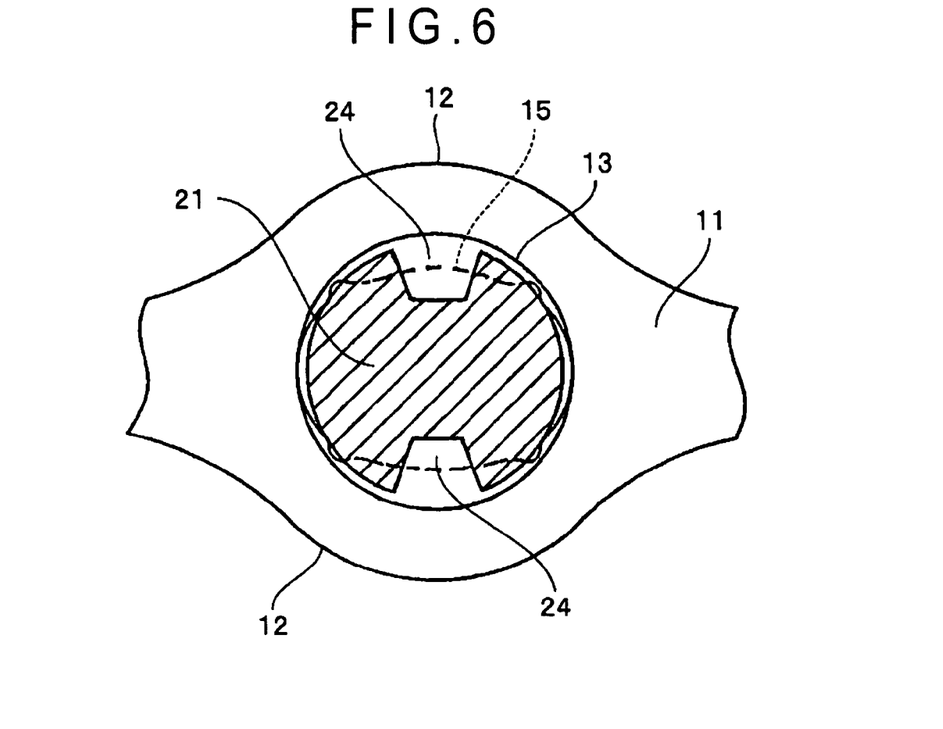
FIG. 6 is a cross section taken along B-B line in FIG. 4 of the connector according to the first embodiment.

As shown in FIG. 1, the belt connecting member 4 (the first member 1) includes a belt connecting bar 10 through which a belt B is threaded and a belt supporting bar 11 having an enlarging portion 12 at a middle position. The enlarging portion 12 is provided with a fitting hole 13 into which a bulging portion 22 provided on a main body 19 of the snap hook 5 is press-fitted. As shown in FIG. 2, the fitting hole 13 is provided in an oval form including an ellipse shape with a short axis S and a long axis L. The fitting hole 13 has recessed cutouts 14 on an inner wall, the cutouts 14 located at positions displaced from the long axis L and the short axis S, namely located substantially at the middle of end portions of the long axis L and the short axis S, so that the enlarging portion 12 can be easily deformed in an elastic manner to expand the fitting hole 13. As shown in FIGS. 4 and 6, the fitting hole 13 has a large-diameter circular shape on an entrance side of the bulging portion 22 (i.e. the side of the belt supporting bar 11 for receiving the bulging portion 22. On the other hand, as shown in FIGS. 2 and 5, the fitting hole 13 has on an exit side (i.e. the side at which the bulging portion 22 is engaged with the belt supporting bar 11) an oval shape including an ellipse having the small-diameter short axis S and the long axis L of substantially the same length as the diameter of the entrance side to define an engaged portion 15.

Figure 3:
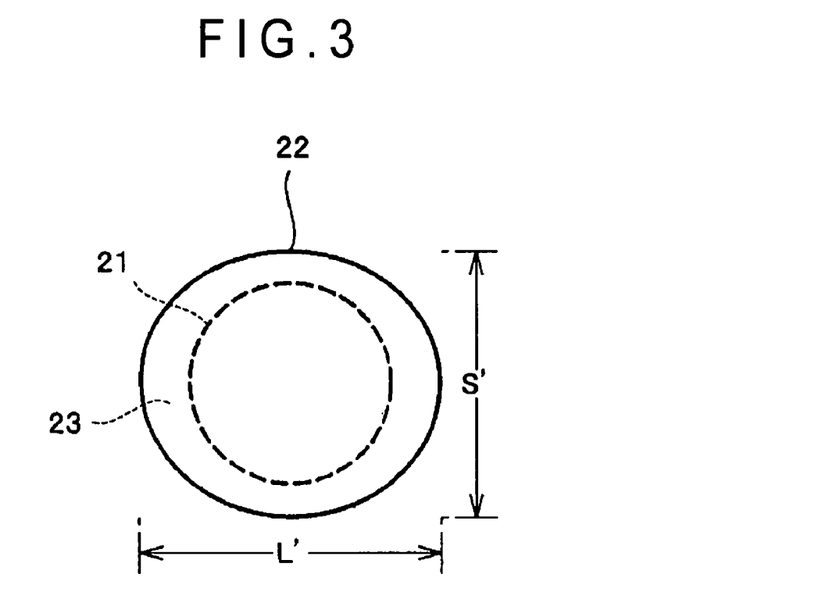
FIG. 3 is a plan view showing a bulging portion of the connector according to the first embodiment.

As shown in FIGS. 1 and 4, the main body 19 of the snap hook 5 is provided with a neck portion 21 projecting from a surface of a base 20 that has a circular shape in plan view. The neck portion 21 is circularly tapered with a larger diameter on a base 20 side and a smaller-diameter on a tip end side. As shown in FIG. 3, the bulging portion 22 is radially bulged on a tip end of the neck portion 21 to define an engaging portion 23 around a circumference thereof. The engaging portion 23 has an oval form including an ellipse shape with a short axis S' and a long axis L'. As shown in FIGS. 1 and 4, in lateral surfaces (surfaces to face the fitting hole 13), recessed portions 24 are provided, thereby reducing required material.

As shown in FIG. 1, in the snap hook 5, a supporting portion 25 and a hook portion 26 are provided in parallel to each other on a rear side of the base 20. The supporting portion 25 includes two attaching holes 27 for attaching an anti-disengagement piece 28 that can close an opening 30 of the hook portion 26. On an inner surface of a tip end of the hook portion 26 in a hook-like shape, an inserting portion 29 in which the anti-disengagement piece 28 can be inserted is formed. The anti-disengagement piece 28 is made of a metal wire, ends of which are displaced from each other in a step-like manner and are inserted in the top and bottom side attaching holes 27 so as to allow an ejection toward an outer side of the hook portion 26 of the snap hook 5.

Figure 8:
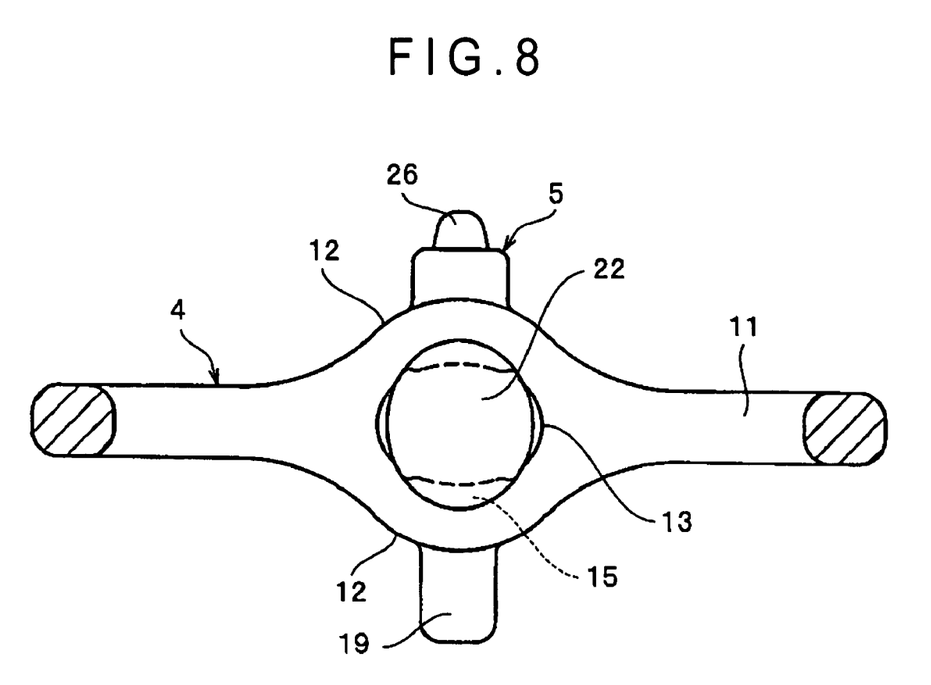
FIG. 8 shows the belt connecting member (the first member) and the snap hook (the second member) of the connector of the first embodiment, the belt connecting member engaged with the snap hook in orthogonal planes.

The belt connecting member 4 and the snap hook 5 are assembled in a following manner. In order to insert the bulging portion 22 on the tip end of the neck portion 21 projecting from the main body 19 of the snap hook 5 into the fitting hole 13 formed in the enlarging portion 12 of the belt supporting bar 11 of the belt connecting member 4, firstly the bulging portion 22 having a top side in an oval form including an ellipse shape is put and inserted to the large-diameter fitting hole 13 formed in the enlarging portion 12 of the belt supporting bar 11. A circumferential end E of the bulging portion 22 is bent as shown in the phantom line in FIG. 4 right before an exit of the fitting hole 13 while, at the same time, the fitting hole 13 is expanded in front and rear directions and right and left directions using the cutouts 14 formed in an inner wall on the exit side of the fitting hole 13. The bulging portion 22 of the fitting hole 13 is further pressed to the outside from the exit side of the fitting hole 13 to be press-fitted, thus completing the assembling of the engaging portion 23 and the engaged portion 15. The assembled snap hook 5 is rotatable relative to the belt connecting member 4 around the neck portion 21. When the snap hook 5 is used for a shoulder bag and the like, the snap hook 5 is used in a manner as shown in FIG. 8, in which the engaging portion 23 of the long axis L' of the bulging portion 22 contacts the engaged portion 15 of the short axis S of the fitting hole 13 and the belt connecting member 4 and the snap hook 5 are kept engaged with the highest anti-disengagement strength.

First Embodiment

As stated above, the connector of the first embodiment shown in FIGS. 1 to 8, the first member 1 of the connector includes the belt connecting member 4 and the second member includes the snap hook 5, the whole belt connecting member 4 and snap hook 5 excluding the anti-disengagement piece 28 is formed by injection molding using a thermoplastic resin. Although the anti-disengagement piece 28 is formed by a metal wire, the anti-disengagement piece 28 may be formed integrally with the snap hook 5 provided on the rear surface of the base 20 using the same synthetic resin. In the snap hook 5, the hook portion 26 of a T-shape cross section is provided so as to project from the rear surface of the circular base 20; a reinforcement portion having the same width is provided on the outer side of the hook portion 26; and a reinforcement portion having the same thickness is provided on the inner side of the hook portion 26, thereby forming the hook-like shape. On the rear surface of the base 20, the supporting portion 25 of a short length is provided next to the hook portion 26. In the supporting portion 25, the two attaching holes 27 are formed on the top and bottom sides. The opening 30 is formed on a tip end of the supporting portion 25 and the tip end of the hook portion 26. The ends of the anti-disengagement piece 28 formed with the metal wire for closing the opening 30 are inserted in the attaching holes 27 to bias the anti-disengagement piece 28 toward the outer side in an ejecting manner. On the inner side on the tip end of the hook portion 26, the inserting portion 29 in a dented shape for accommodating the tip end of the anti-disengagement piece 28 is formed.

The circular neck portion 21 is provided at the middle of the top surface of the circular base 20. The neck portion 21 is formed such that the base portion thereof is thick as shown in FIG. 6 and the tip end side is thin as shown in FIG. 5. The bulging portion 22 that radially bulges is provided on the tip end of the neck portion 21, on which the engaging portion 23 engageable with the fitting hole 13 of the belt connecting member 4 is provided. The bulging portion 22 includes an oval bottom surface forming the engaging portion 23 integrally connected with the neck portion 21 and the oval top surface slightly smaller than the oval bottom surface. The bulging portion 22 is tapered from the bottom surface to the top surface. The oval shapes forming the bottom surface and the top surface of the bulging portion 22 each include an ellipse shape, where the long axis L' is defined in the same direction as a hooking direction (a direction in which the anti-disengagement piece 28 is moved) and the short axis S' is defined in a direction orthogonal to the hook portion 26. The recessed portion 24 in a dented shape is provided on a lateral side of the neck portion 21 (a side orthogonal to the hook portion 26). When the bulging portion 22 is press-fitted into the fitting hole 13 as shown in FIG. 4, the recessed portion 24 is covered by the fitting hole 13, so that the recessed portion 24 cannot be seen from the outside. Hence, by providing the recessed portion 24, the required molding material of the connector can be reduced.

Since the belt B is connected through the belt connecting member 4 as stated above, the belt connecting bar 10 that has a rectangular shape as a whole is provided, the belt B connected through one side of the rectangular shape. The belt supporting bar 11 is provided so as to correspond to the belt connecting bar 10. The belt supporting bar 11 is provided with the enlarging portion 12 enlarging at the middle in the width direction of the belt supporting bar 11. The enlarging portion 12 accommodates the neck portion 21 provided to the main body 19 of the snap hook 5. The fitting hole 13 in which the bulging portion 22 formed on the tip end of the neck portion 21 can be press-fitted is provided. The fitting hole 13 is formed in an oval form including an ellipse shape in which the entrance side (the inserting side of the bulging portion 22) of the fitting hole 13 has a circular shape having the same diameter as the long axis L' of the bulging portion 22 and the exit side of the fitting hole 13 from which the bulging portion 22 exits is formed in an oval form including an ellipse shape of which long axis is equal to the long axis L' of the oval form of the bottom surface of the bulging portion 22 and of which diameter on the exit side orthogonal to the long axis L' is equal to the diameter of the neck portion 21 as shown in FIG. 5. The engaged portion 15 formed with the long axis L and the short axis S which are engageable with the bulging portion 22 is provided around the circumference of the fitting hole 13 on the exit side. As shown in FIGS. 1 and 2, the recessed cutouts 14 are provided on the four corners on the exit side of the fitting hole 13 such that the engaged portion 15 can be easily deformed when the bulging portion 22 is press-fitted, enabling a smooth press-fitting.

When the belt connecting member 4 and the snap hook 5 are connected, it is preferable that the recessed cutouts 14 are provided on an inner wall of the bulging portion 22 of the fitting hole 13 on the exit side at positions displaced relative to the diameter in the longitudinal direction of the belt supporting bar 11 namely at positions substantially at the middle of the long axis L and the short axis S of the fitting hole 13. Hence, as seen in FIG. 4, when the bulging portion 22 is press-fitted in the fitting hole 13, the enlarging portion 12 can be easily elastically deformed, thereby facilitating the press-fitting. By setting the long axis L' and the short axis S' of the oval form of the engaging portion 23 and the long axis L and the short axis S of the oval form of the engaged portion 15 to satisfy the relationship of S'>S, (S'−S)>(L'−L), a force for expanding the enlarging portion 12 can be easily applied and the bulging portion 22 can be easily bent when being press-fitted, so that the assembling can be facilitated.

Figure 7:
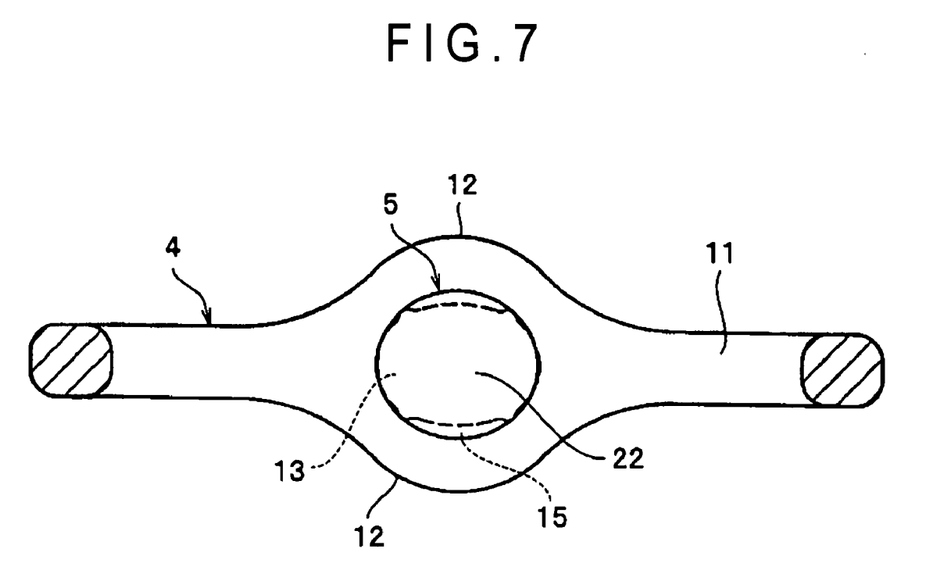
FIG. 7 shows a belt connecting member (a first member) and a snap hook (a second member) of the connector of the first embodiment, the belt connecting member engaged with the snap hook in a common plane.

In the connector of which belt connecting member 4 and the snap hook 5 are connected, the belt connecting member 4 and the snap hook 5 can freely rotate since the neck portion 21 is formed in the circular shape, where a contacting area or a contacting surface of the engaging portion 23 and the engaged portion 15 shown in FIGS. 7 and 8 changes in accordance with the rotation of the belt connecting member 4 and the snap hook 5. In other words, since the short axis S of the fitting hole 13 forming an engaging area and the short axis S' of the engaging portion 23 contacting the short axis S change from S' to L', the anti-disengagement strength of the long axis L' can be made anisotropic. Particularly as shown in FIG. 8, even when the snap hook 5 and the belt connecting member 4 are orthogonal which is often seen in the belt connecting member 4 using the snap hook 5 in a shoulder bag and the like, the engaging portion 23 of the long axis L' of the bulging portion 22 of the snap hook 5 can be engaged with the short axis S of the engaged portion 15 formed on the belt supporting bar 11 of the belt connecting member 4, so that the engagement can be strongest, thereby preventing disengagement of the snap hook 5 from the belt connecting member 4.

Second Embodiment

Figure 9:
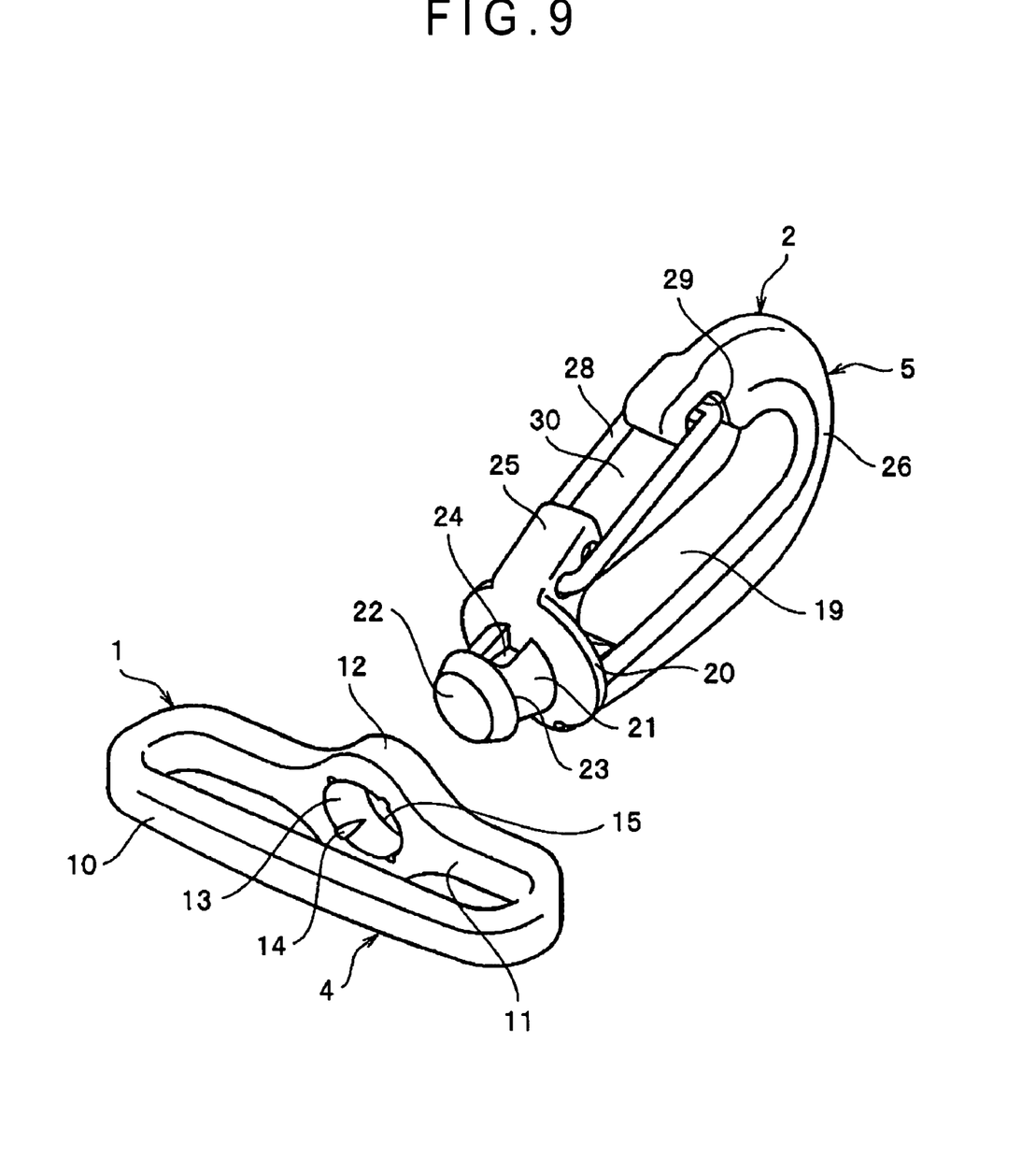
FIG. 9 is an exploded perspective view of a connector according to a second embodiment of the invention.

The connector according to a second embodiment shown in FIG. 9 is the same as the first embodiment except that the engaging portion 23 of the bulging portion 22 is phase-shifted by ninety degrees from the arrangement shown in FIG. 3, where the short axis S' is defined on the engaging portion 23 of the bulging portion 22 in the same direction as the direction of the main body 19 of the snap hook 5 (i.e. the direction as the hooking direction of the hook portion 26) and the long axis L 7 is defined in a direction orthogonal to the hooking direction of the hook portion 26. The other arrangements are the same as the example above. The exemplary usage of the snap hook 5 herein is suitable for an embodiment of which phase is different from the first embodiment by ninety degrees.

Third Embodiment

Figure 10:
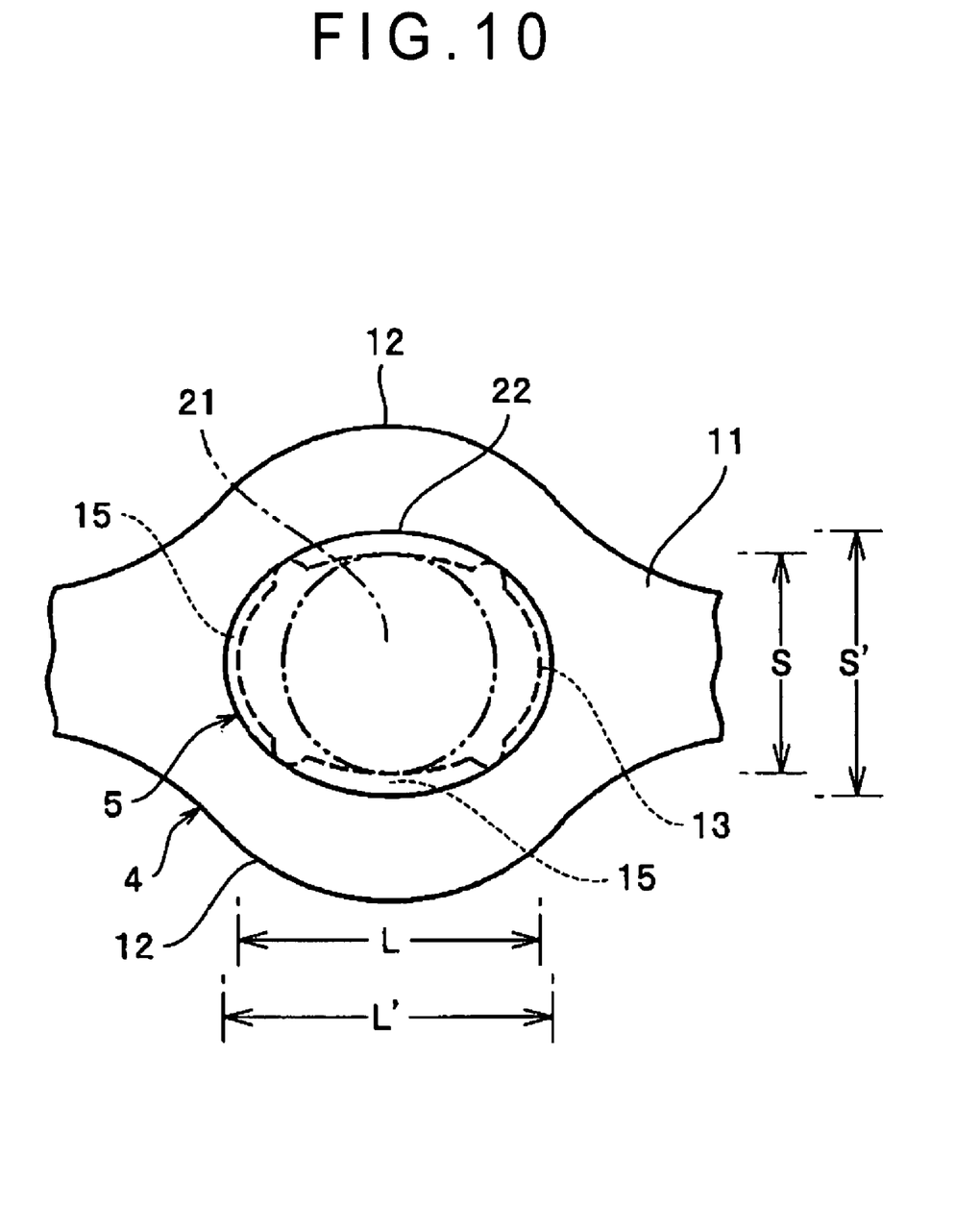
FIG. 10 shows an engagement of a bulging portion with a fitting hole according to a third embodiment of the invention.

A connector according to a third embodiment as shown in FIG. 10 differs from the first embodiment in the shape of the fitting hole 13 of the enlarging portion 12 of the belt supporting bar 11 of the belt connecting member 4 on the exit side and in the bulging portion 22 of the snap hook 5. Specifically, in the first embodiment, the engaged portion 15 on the exit side of the fitting hole 13 provided on the enlarging portion 12 of the belt supporting bar 11 (i.e. the long axis L) and the short axis S are formed such that the long axis L of the fitting hole 13 has the same length as the long axis L' of the bulging portion 22 as shown in FIGS. 2 and 3. In contrast, in the third embodiment, the fitting hole 13 is formed in an oval form (having an ellipse shape) with the long axis L and the short axis S; and the bulging portion 22 of the snap hook 5 is formed with the long axis L' and the short axis S' which are larger than the long axis L and the short axis S of the fitting hole 13, so that the engaging strength can be further enhanced. Herein, it is preferable that the long axes L, L' and the short axes S, S' have a relationship of (S−S')>(L'−L)>0. Accordingly, the assembling can be facilitated and the engaging strength can be enhanced.

Fourth Embodiment

Figure 11:
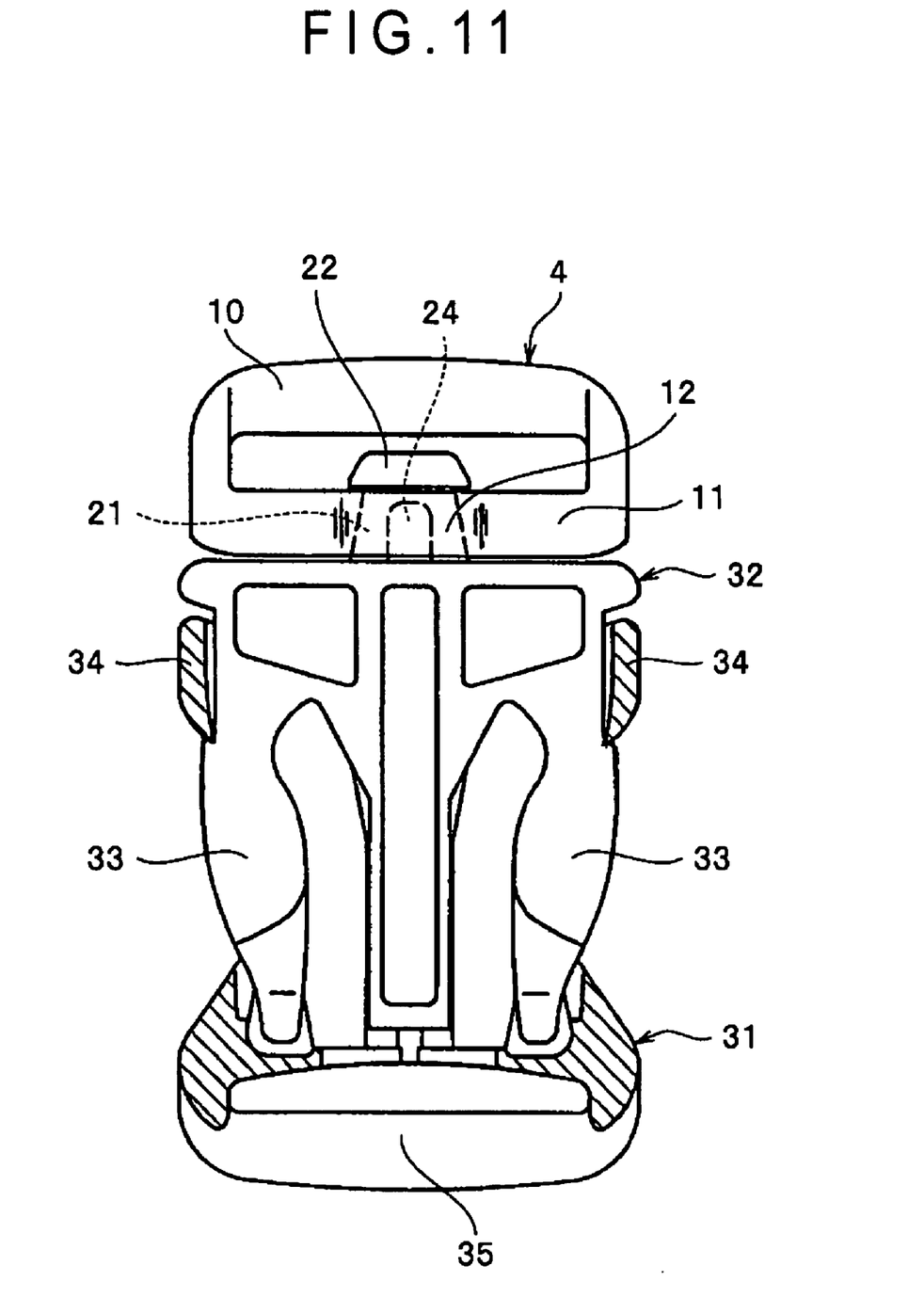
FIG. 11 is a front view showing, with a partial cutout, a buckle of a connector according to a fourth embodiment of the invention.

A connector according to a fourth embodiment as shown in FIG. 11 is applied to an insert-type buckle. Insertion legs 33 provided on both sides of an insertion body 32 are inserted from an insertion port of a buckle main body 31 to be engaged with side walls 34 of the buckle main body 31. The buckle main body 31 is provided with a belt attaching portion 35 for attaching the belt B on the other side of the insertion port. The insertion body 32 is provided with the same neck portion 21 as that in the first embodiment in the middle of the other side of the insertion legs 33. On the tip end of the neck portion 21, the bulging portion 22 is provided. The belt connecting member 4 is formed in a rectangular frame shape. The same fitting hole 13 as that in the first embodiment is provided in the enlarging portion 12 of the belt supporting bar 11, the neck portion 21 of the insertion body 32 and the bulging portion 22 are press-fitted into the fitting hole 13 to be engaged. When in use, the belts are threaded through the belt attaching portion 35 and the belt connecting bar 10.

Fifth Embodiment

Figure 12:
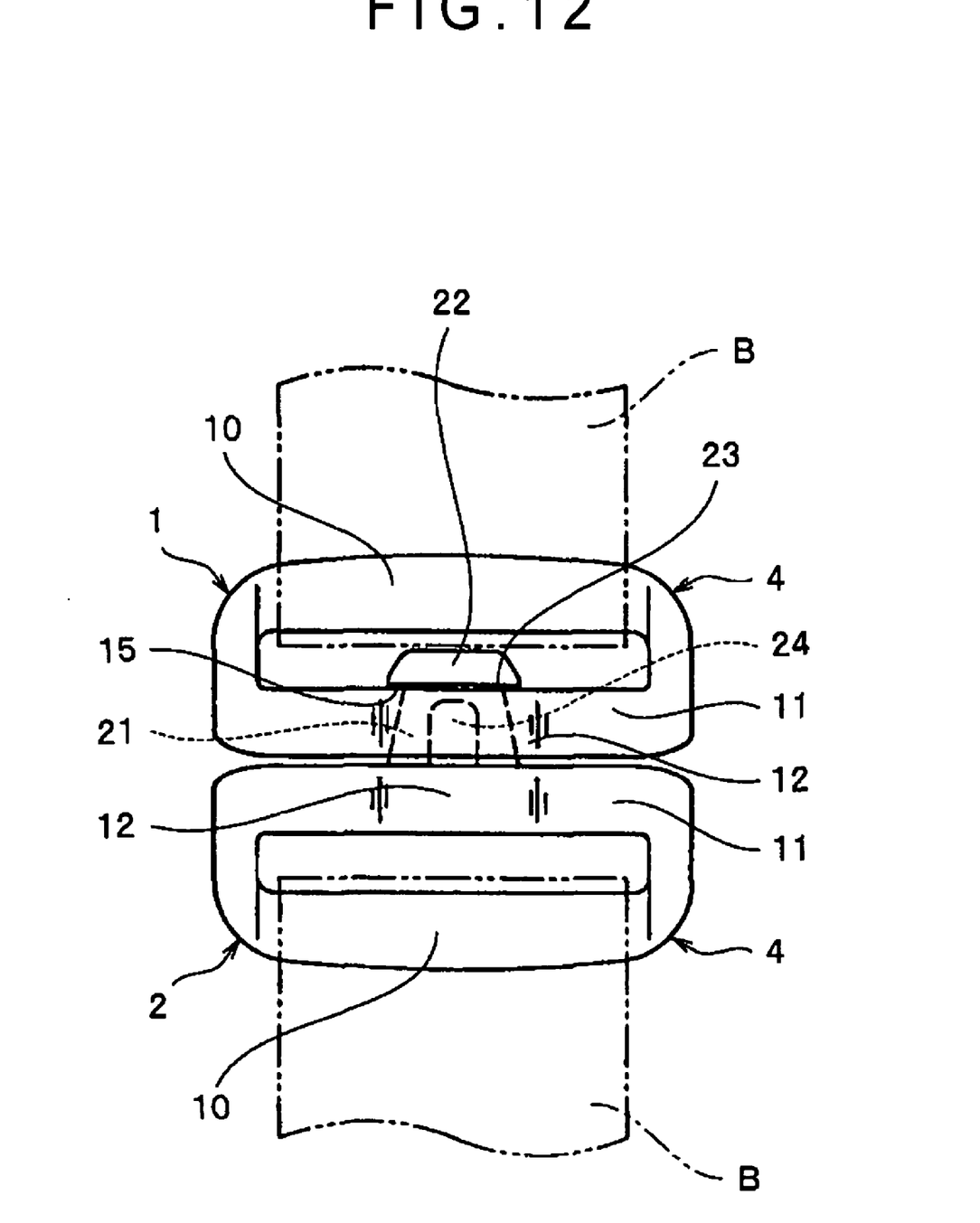
FIG. 12 is a front view showing a belt connecting member of a connector according to a fifth embodiment of the invention.

A connector according to a fifth embodiment as shown in FIG. 12 is formed by the belt connecting members 4 used for connecting the belt B. In one belt connecting member 4, the neck portion 21 is provided to project from the enlarging portion 12 formed at the middle of the belt supporting bar 11 and the bulging portion 22 is formed on the tip end of the neck portion 21. In the other belt connecting member 4, the fitting hole 13 is formed in the enlarging portion 12 formed at the middle of the belt supporting bar 11, the bulging portion 22 being press-fitted into the fitting hole 13. The fitting hole 13, the neck portion 21 and the bulging portion 22 are configured in the same manner as those in the first embodiment and are used with the belts B respectively connected through the connecting bars 10.

The priority application Number JP 2006-222631 upon which this patent application is based is hereby incorporated by reference.

What is claimed is:

1. A connector, comprising:
   a first member; and
   a second member,
   one of the first member and the second member including:
      a neck portion projecting from the one of the first member and the second member, the neck portion having a circular cross section;
      an oval bulging portion formed on a tip end of the neck portion, and
      an engaging portion provided by a circumference of the bulging portion;
   the other of the first member and the second member including:
      a fitting hole into which the bulging portion is press-fitted in a rotatable manner, the fitting hole defining an entrance side and an exit side of the bulging portion, the entrance side having a circular shape and the exit side having an oval shape having a smaller diameter than the circular shape of the entrance side; and
      an engaged portion formed on a periphery of the fitting hole on the exit side to be engageable with the engaging portion;
   wherein
      the engaging portion formed on the bulging portion and the engaged portion formed in the fitting hole are so formed that a size of a contacting area varies in accordance with a position on which the first member and the second member rotate around the neck portion inserted into the fitting hole.

2. The connector according to claim 1, wherein
   the first member is a belt connecting member,
   the second member is a main body of a loop clutch,
   the bulging portion is provided on the main body of the loop clutch, and
   the fitting hole is provided on a belt supporting bar of the belt connecting member.

3. The connector according to claim 2, wherein
   the main body of the loop clutch and the belt connecting member are so connected that a contacting area of the engaging portion and the engaged portion when the main body of the loop clutch and the belt connecting member are in orthogonal planes becomes larger than that when the main body of the loop clutch is flush with the belt connecting member.

4. The connector according to claim 1, wherein the engaging portion is formed in a shape of a truncated cone.

5. The connector according to claim 1, wherein the exit side includes a recessed cutout on an inner wall thereof.

6. The connector according to claim 1, wherein a long axis $L'$ and a short axis $S'$ of the bulging portion of the oval shape and a long axis $L$ and a short axis $S$ of the exit side of the fitting hole satisfy relationships of $S'>S$ and $(S'-S)>(L'-L)$.

* * * * *